UNITED STATES PATENT OFFICE.

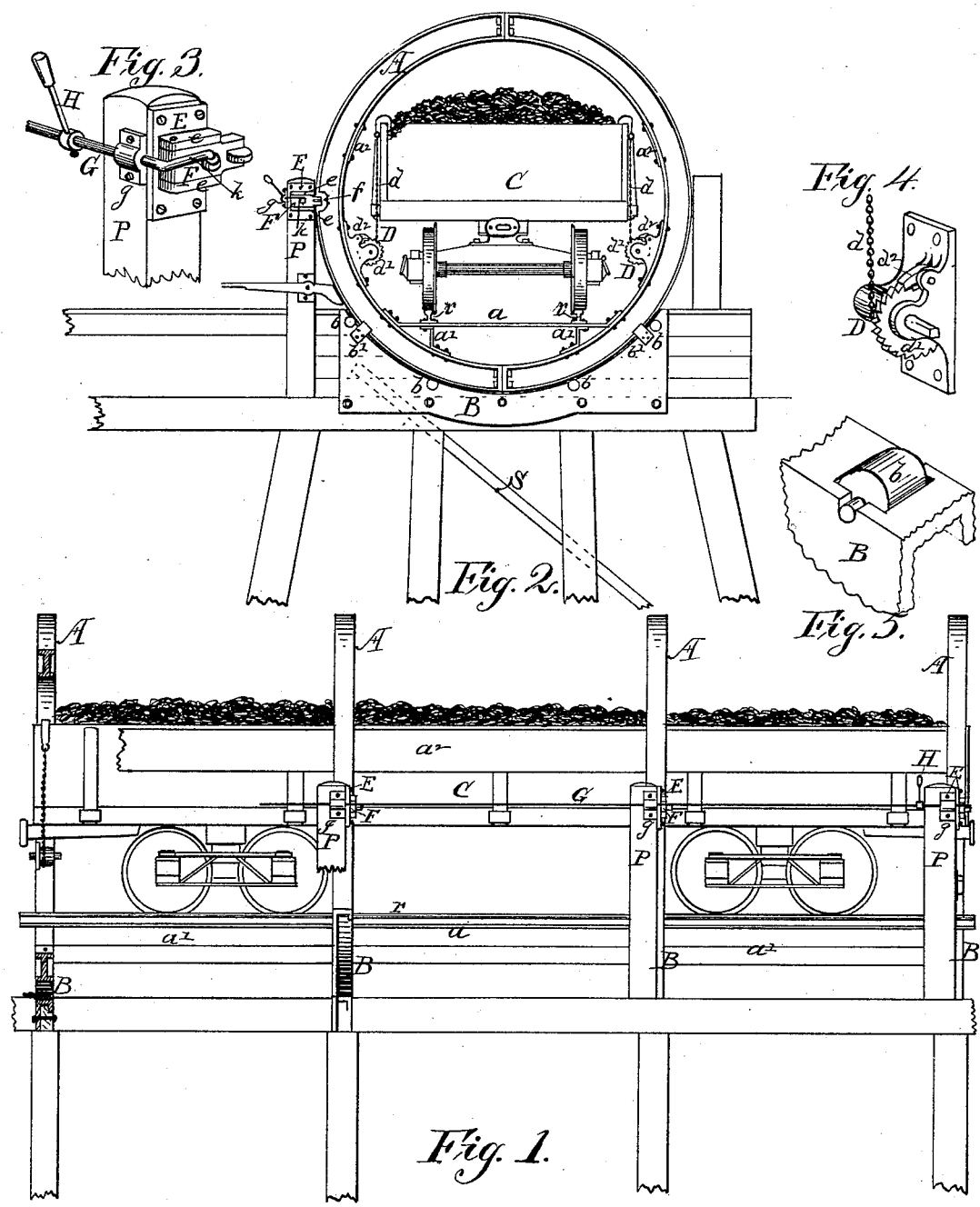

PATRICK LEAVITT, OF ELYRIA, OHIO.

DUMPING APPARATUS FOR RAILROAD-CARS.

SPECIFICATION forming part of Letters Patent No. 304,831, dated September 9, 1884.

Application filed July 23, 1884. (No model.)

*To all whom it may concern:*

Be it known that I, PATRICK LEAVITT, of Elyria, in the county of Lorain and State of Ohio, have invented certain new and useful Improvements in Dumping Apparatus for Railway-Cars, of which the following is a specification.

This invention relates to an apparatus for unloading railway-cars; and it consists of a rotating platform fixed in heavy rings arranged to turn in semicircular ways, the platform having a track upon which the car is run, and which is firmly secured by means of chains and hooks attached to windlasses for tightening them in such a manner that the platform and car are both turned over together. A suitable latching device, for holding the rings from turning until required, is arranged along one side of the platform, attached to strong posts standing by the side of the rings, which is worked by the operator when the platform is to be rotated.

The construction and operation of this apparatus is as follows, reference being had to the accompanying drawings, in which—

Figure 1 is a side elevation, and Fig. 2 is an end elevation, showing my apparatus having a loaded car upon it ready for dumping. Fig. 3 shows one of the latches secured to the top of one of the posts. Fig. 4 is a detached view of one of the windlasses used for securing the car inside of the rings and to the platform. Fig. 5 is a detached view showing one of the friction-rollers set in the curved ways on which the rings ride.

A are heavy iron rings, secured firmly together near their lower sides by a floor, $a$, upon which is laid rails $r\ r$, forming the track for the car C. The floor is also supported by angle-pieces $a'$, secured to the under side of the floor beneath the rails, and also secured to the inside flanges of the rings. These also serve to tie and brace the rings together. The rings are also secured together by side bars, $a^2$. This constitutes my rotating platform.

B are heavy curved ways, firmly bolted to a suitable timber trestle-work, in which the said rings A are set, and in which they rotate. At suitable intervals in the curved surface of said ways are placed friction-rollers $b$, upon which the said rings ride. Stop-pieces $b'$ are also fixed to the ways, to prevent any slipping or lateral movement of the rings in the ways.

Brackets having windlasses D are fixed in the end rings A, having chains $d$, with hooks, which take onto the upper four corners of the car-body C. The windlasses are provided with ratchet-wheels $d'$ and dogs $d^2$, for holding the chains taut, and for holding the car onto the track when the platform is rotated. The windlasses may be operated by a crank or lever for tightening the chains. By the side of said rings A are placed stout posts P, set firmly in the trestle-work. The tops of the said posts come opposite to the middle of the said rings, and are provided with latching devices, which consist of a casting, E, having a stout latch-bar, F, hinged between two ears, $e\ e$. This latch-bar, when shut, catches into a notch, $f$, made in the side of the outer flange of the rings A. The said latch-bars F are operated simultaneously by a rod, G, attached to all the posts by plates $g$, the said rod being provided with arms $h$, attached to lugs $l$ on the side of the latch-bars F. H is a handle secured onto the rod G, by which it is moved. To a post, P, is attached a brake-lever, L, by which the rotations of the platform may be controlled.

The operation of this apparatus is as follows: The loaded car having been run in on the platform and secured thereon, as seen in Fig. 2, is ready to be dumped. This is done, as will now readily be seen, by throwing out the latches, releasing the rings. Then the operator starts the platform and its loaded car in their rotary motion, which requires but little force, because they are equally poised over the center of motion, and when the movement is fairly begun the weight of the load, which, being superincumbent, accelerates the movement, and the car and platform are thereby self-rotated and the load self-discharged, which, falling on a chute, S, or inclined floor, may be discharged into a boat or any other receptacle. When the load has been discharged, the car-body is lightened. Then the trucks, being heaviest, cause the car and platform to rotate back again.

Having described my invention, I claim—

1. The rotating platform, consisting of the rings A, having floor $a$, supported with angle-pieces $a'$, and having track-rails $r\ r$, and the tie-bars $a^2$, the said rings provided with windlasses D, having ratchets $d'$, dogs $d^2$, and chains $d$, for securing the car to said platform, all constructed substantially as described.

2. The combination, with the rotating platform above described, of the curved ways B, secured to the trestle-work, and provided with the friction-rolls $b$ and stops $b'$, the posts P, having the latching devices, consisting of the plates E, having latches F pivoted thereto, the operating-rod G, connecting the said latches for simultaneous operation to disengage them from the notches $f$ of rings A, and the brake-lever L, all substantially as specified.

PATRICK LEAVITT.

Witnesses:
E. G. JOHNSON,
CHAS. S. BIRD.